US009443082B2

(12) United States Patent
Garraway et al.

(10) Patent No.: US 9,443,082 B2
(45) Date of Patent: Sep. 13, 2016

(54) USER EVALUATION

(71) Applicant: International Business Machines Corporation, Armonk, NY (US)

(72) Inventors: Richard S. Garraway, Winchester (GB); Martin J. Hitchman, Winchester (GB); Richard Postlethwaite, Hursley (GB); Mark R. Wilson, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/333,616

(22) Filed: Jul. 17, 2014

(65) Prior Publication Data

US 2015/0040219 A1 Feb. 5, 2015

(30) Foreign Application Priority Data

Aug. 5, 2013 (GB) .................................. 1313980.3

(51) Int. Cl.
*G06F 21/62* (2013.01)
*G06F 21/55* (2013.01)
*G06F 21/57* (2013.01)

(52) U.S. Cl.
CPC ......... *G06F 21/554* (2013.01); *G06F 21/6245* (2013.01); *G06F 21/552* (2013.01); *G06F 21/577* (2013.01)

(58) Field of Classification Search
CPC ............. G06F 21/6245; G06F 21/554; G06F 21/552; G06F 21/577; H04L 63/1416; H04L 63/10
USPC ....................................................... 726/22
See application file for complete search history.

(56) References Cited

U.S. PATENT DOCUMENTS

| | | | |
|---|---|---|---|
| 6,119,103 A * | 9/2000 | Basch ................. | G06Q 20/341 705/35 |
| 2004/0230476 A1* | 11/2004 | Messer ........................... | 705/10 |
| 2007/0143827 A1* | 6/2007 | Nicodemus et al. ............ | 726/2 |
| 2008/0288330 A1* | 11/2008 | Hildebrand et al. ............ | 705/10 |
| 2010/0161752 A1 | 6/2010 | Collet et al. | |
| 2011/0060906 A1* | 3/2011 | Lafon et al. ................... | 713/168 |
| 2011/0307957 A1* | 12/2011 | Barcelo et al. ................. | 726/25 |
| 2011/0321175 A1* | 12/2011 | Slater .............................. | 726/28 |
| 2012/0066763 A1* | 3/2012 | McHugh ............... | G06F 21/577 726/22 |
| 2012/0259849 A1 | 10/2012 | Deodhar et al. | |
| 2013/0097701 A1* | 4/2013 | Moyle et al. ................... | 726/22 |
| 2013/0218869 A1* | 8/2013 | McConnell et al. .......... | 707/722 |
| 2013/0218882 A1* | 8/2013 | McConnell et al. .......... | 707/728 |
| 2013/0232582 A1 | 9/2013 | Jin et al. | |

OTHER PUBLICATIONS

Search Report for GB1313980.3 (filed Aug. 5, 2013), UK Intellectual Property Office, mailed Jan. 15, 2014, 3 pages.

* cited by examiner

*Primary Examiner* — Don Zhao
(74) *Attorney, Agent, or Firm* — VanLeeuwen & VanLeeuwen; Parashos Kalaitzis

(57) ABSTRACT

Improving the integrity of a computer system including a plurality of user accounts by, for each user account, monitoring events on the computer system that are related to the user account, assigning an importance score to the monitored user account that is indicative of the importance of the monitored user account to the integrity of the computer system, the importance score being calculated from the monitored events, and providing the importance score to a system administrator upon the administrator attempting to alter the monitored user account.

17 Claims, 3 Drawing Sheets

USER EVALUATION

BACKGROUND

The present disclosure relates to improving the integrity of a computer system including a plurality of user accounts.

Nowadays, most businesses heavily rely on computer systems for underpinning the business. Such computer systems typically are used by many users, e.g. employees, having their own user accounts on the system. Such user accounts may for instance contain files owned by the particular user.

The pool of users and associated user accounts typically is a dynamic pool. People may leave a business, which typically triggers the deletion of the user account of the user from the computer system of the business they have left. However, this can compromise the integrity of the computer system. It is not unusual that files or other digital content owned by a particular user are also being used by different users of the computer system when performing their tasks. Therefore, the deletion of such digital content can compromise the integrity of the computer system in the sense that the system is no longer capable to implement the desired business processes, e.g. services, due to the deletion of digital content that is being relied upon by existing users.

Often, it is practically infeasible for a system administrator to evaluate the relevance of a user account to the overall computer systems as such an exercise would be prohibitively time-consuming, especially if the departed user has large volumes of digital content in his account. A partial solution is being provided by US 2012/0259849 A1, which discloses a method for determining the accurate ownership of a file within a data system by identifying a first plurality of access events for a file, wherein the file is associated with a directory of related files, identifying a second plurality of access events for the related files within the directory, wherein access events in the first and second plurality of access events occur within a period, determining a pool of users accessing files within the directory within the period and selecting a user from the pool of users as an inferred owner of the file based on access metrics related to the plurality of access events. However, there still exists a need for more robust protection of the integrity of such computer systems.

SUMMARY

The present invention seeks to provide a method for improving the integrity of a computer system including a plurality of user accounts.

The present invention further seeks to provide a computer program product for facilitating the implementation of such a method.

The present invention yet further seeks to provide a computer system for implementing such a method.

Embodiments of the invention are defined by the claims.

According to an aspect of the present invention, there is provided a method for improving the integrity of a computer system including a plurality of user accounts, the method including monitoring events on the computer system, where the monitored events are related to a user account selected from the plurality of user accounts, assigning an importance score to the monitored user account that is indicative of the importance of the monitored user account to the integrity of the computer system, the importance score being calculated from the monitored events, and providing the importance score to a system administrator upon the administrator attempting to alter the monitored user account.

By automatically building a user profile during the lifetime of the user account by monitoring events associate with the monitored user account, the relevance or importance of the user to the overall system can be assessed at any suitable point in time, most notably when attempting to alter the monitored user account, e.g. deleting at least a part of the user account. Consequently, deletion of users (and their digital content) deemed important to the computer system can be avoided, thereby improving the integrity of the computer system.

The monitoring may be based on any set of rules defined by the business that are considered to capture an indicator of the importance of the user to the computer system.

For instance, the monitoring may include monitoring access of files within the user account by other users, which provides an indication of the importance of these files to other users.

For instance, the monitoring may include monitoring the number of executable scripts, e.g. CRON jobs, within the user account as such scripts are typically only present in the accounts of users with a relatively high degree of importance to the computer system.

For instance, the monitoring may include monitoring the utilization of at least one processor of the computer system by the user of the monitored user account. High utilization rates of such processors are typically indicative of the relevance or importance of the user to the computer system.

A further refinement to the calculation of the importance score may be provided by applying respective weighting factors to different types of monitored events and combining the weighted event types into the importance score. This may further improve the accuracy of the calculated importance score.

Such weighting factors may be user-defined. For instance, the method may further comprise receiving the respective weighting factors from a system administrator prior to the calculating.

In an embodiment, providing the importance score to a system administrator further includes returning a confirmation request to the administrator. This may for instance request confirmation of the (partial) deletion of the specified user account to allow the system administrator to reconsider the request upon learning the importance score of the user associated with the monitored user account.

In a further embodiment, providing the importance score to a system administrator further includes returning a request for authorization information if the assigned importance score exceeds a defined threshold. This further protects the computer system against the unwanted deletion of accounts of important users, as the system administrator requesting the (partial) deletion of the user account is triggered to provide the additional authorization, which will alert the system administrator that the requested deletion is potentially harmful to the computer system, or may even require the system administrator to obtain the requested authorization information from another person in case the system administrator does not possess the requested authorization information, such that at least two people must authorize the (partial) deletion of the user account.

According to another aspect of the present invention, there is provided a computer program product including a computer-readable storage medium, the medium including computer program code for implementing the method according to embodiments of the present invention when executed on at least one processor of a computer system.

In an embodiment, the computer-readable storage medium is selected from a CD, DVD, flash memory card, a USB memory stick, a random access memory, a read-only memory, a computer hard disk, a storage area network, a network server and an Internet server.

According to yet another aspect of the present invention, there is provided a computer system including the computer program product according to embodiments of the present invention and at least one processor adapted to execute the computer program code.

The computer system may further include a user interface for receiving the user importance score from the at least one processor.

BRIEF DESCRIPTION OF THE DRAWINGS

Embodiments of the present invention will now be described, by way of example only, with reference to the following drawings, in which.

DETAILED DESCRIPTION

Figure 1:
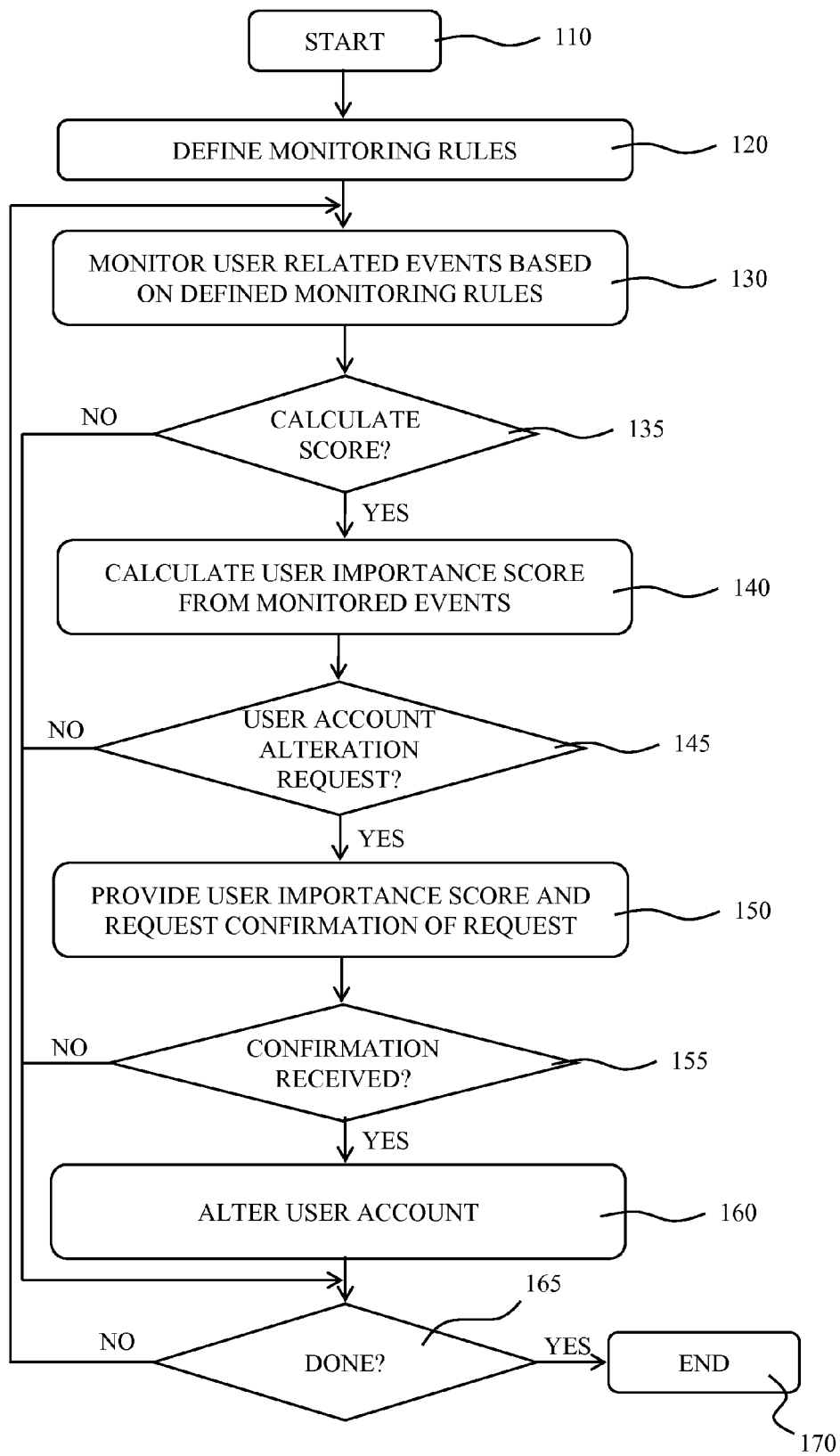
FIG. 1 schematically depicts a flow chart of a method according to an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more processes.

The various embodiments of the method of the present invention may be stored on a computer program product including a computer-readable storage medium. The computer-readable storage medium may be any medium that can be accessed by a computer for the retrieval of digital data from the medium. Non-limiting examples of a computer-readable storage medium include a CD, DVD, flash memory card, a USB memory stick, a random access memory, a read-only memory, a computer hard disk, a storage area network, a network server, an Internet server and so on.

In the context of the present application, a (computer) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

At least some embodiments of this method seek to prevent the loss of data owned by a particular user upon which other users rely by assessing the importance of the particular user to the overall computer system. This is for instance of particular importance in environments where users provide digital content such as files, services and so on that are being used by other users of the computer system, where the loss of such digital content would prevent other users from utilizing the computer system in the most efficient manner, or even prevent the other users from utilizing the computer system at all. This would seriously compromise the integrity of the computer system, which could have serious negative implications for a business relying on the integrity of such a computer system for conducting its business. This may apply to a wide range of businesses, e.g. a sales environment where sales services are being shared between users, a software development environment where software templates, libraries and so on are being shared between developers, a financial services environment in which market or database evaluation tools are being shared between multiple analysts or traders and so on. At least some embodiments of the present method seek to provide a user authorized to make alterations to accounts of other users, e.g. partial or complete deletion of such user accounts, with system-generated metrics that will help this authorized user to make an informed assessment of the (business) relevance of the user of this account to be altered, thereby limiting the risk that data relevant to other users is lost, thus improving the integrity of the computer system.

In the context of the present application, a user authorized to make alterations to accounts of other users, in particular a user authorized to at least partially delete the account of another user will be referred to as a system administrator. It should be understood that the use of this term is not in any way intended to limit the scope of the present invention to particular authorized users of a computer system, e.g. users having this particular job title. The term system administrator is intended to cover any user authorized to make alterations to accounts of other users.

FIG. 1 schematically depicts a flow chart of a computer-implemented method for improving the integrity of a multi-user computer system, in particular the data integrity of such a system. The method starts in step 110, e.g. with the activation of the computer system, after which the method proceeds to step 120 in which the computer system is provided with the rules defined by the business for monitoring a set of events that are considered indicative of the importance of a user to the integrity of the computer system. Non-limiting examples of such events include: access of files owned by a user to be monitored by other users, which provides an indication of the importance of these files to other users; the number of executable scripts, e.g. CRON jobs, within the user account as such scripts are typically only present in the accounts of users with a relatively high degree of importance to the computer system; and the utilization of at least one processor of the computer system by the user of the monitored user account. High utilization rates of such processors are typically indicative of the relevance or importance of the user to the computer system.

Other suitable metrics will be apparent to the skilled person. The method subsequently proceeds to step 130 in which the defined events related to selected or all users of the computer system are monitored, e.g. the number and/or frequency of files owned by a particular user accessed by other users, the number of executable scripts owned by a particular user, the usage of the processor(s) of the computer system by a particular user and on. The monitoring may be performed at any suitable frequency. In an embodiment, different types of events are monitored at different frequencies. For instance, file access and processor utilization may be monitored on a continuous or high frequency basis, as these are typically events that can fluctuate as a function of time, whereas the monitoring of the number of executable scripts owned by a particular user may be performed at a much lower frequency, given that this is likely to be a more static metric. The monitoring frequencies may be defined in any suitable manner, e.g. by a system administrator or the like.

At defined points in time, an importance score is calculated for the one or more user accounts being monitored. This is decided in step 135. If there is no need to calculate such a score, the method may proceed to step 165 in which it is decided if the method is to be terminated, in which case the method proceeds to step 170 where the method terminates, or whether the monitoring needs to continue, in which case the method reverts back to step 130. If on the other hand a user score is to be calculated, for instance because a defined time period for monitoring the user-related events has completed, or because a request has been received to alter a user account, e.g., at least partially delete the account, the method proceeds to step 140 in which the user importance score for at least one particular user is calculated.

In an embodiment, this score may be calculated by combining the values obtained from the monitoring into such a score. The exact form of the process suitable for calculating such an importance score may vary from business to business, and may depend on the nature of that business. For instance, in certain business file sharing will be particularly critical whereas in other businesses the ownership of executable scripts is particularly critical. It suffices to say that any suitable process may be selected, which selection may be governed by the particular business needs.

In an embodiment, the process may combine a set of monitored events into a single user importance score, with each event being attributed a weighting factor in accordance with the perceived relevance of the event to the importance score. Such a weighting factor may for instance be defined by the business, e.g. by the system administrator. By way of non-limiting example, using the above example events:
 (A): number of files owned by a particular user accessed by other users;
 (B) the number of executable scripts, e.g. CRON jobs, within the account of the particular user account; and
 (C) the utilization of at least one processor of the computer system by the particular user;
a user relevance score UI may for instance be expressed as:

$$UI = x(A)/100 + y(B)/100 + z(C)/100$$

wherein x, y and z are defined weighting factors. The higher the value of UI, the higher the importance of the user is to the computer system. It is noted that (A), (B) and (C) may be normalized values of the monitored events.

This user importance score may be used by the computer system to inform a system administrator requesting an alteration of a particular user account, typically a partial or complete deletion of the account of the perceived importance of the user to the system. For instance, the method may check in step 145 if such a request has been made. In the absence of such a request, the method may proceed to step 165 as previously explained. On the other hand, upon receiving such a request, the method proceeds to step 150 in which the computer system provides the system administrator with the calculated user importance score such that the system administrator can reconsider the requested alteration of the particular user account, e.g. reconsider (partial) deletion of this account. In an embodiment, the system administrator is furthermore requested by the computer system to confirm his request to alter the particular user account following being provided with the importance score for this particular user. For instance, the system administrator may be provided with a message along the lines of:

Importance score of user X is Y, are you sure you wish to delete this account (y/n)?

Obviously, this message may be phrased in many different ways. Next, the method checks in step 155 if the requested confirmation is indeed received. If not, the method proceeds to step 165 as previously explained; otherwise, the method proceeds to step 160 in which the user account altered as requested, e.g. deleted from the computer system, after which the method proceeds to step 165.

Figure 2:
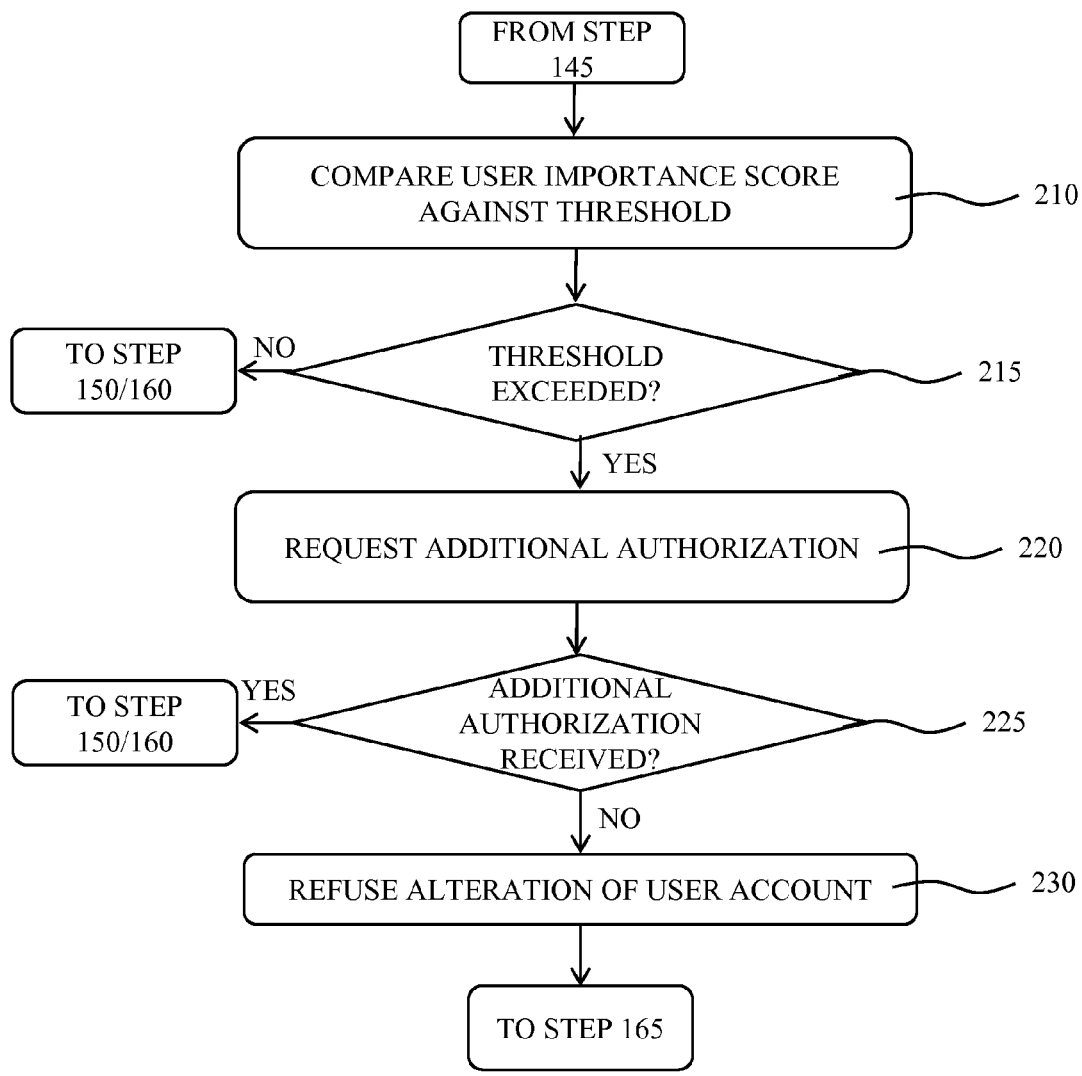
FIG. 2 schematically depicts a flow chart of an aspect of a method according to another embodiment of the present invention.

FIG. 2 schematically depicts a flow chart of an alternative embodiment of the method of FIG. 1. In this embodiment, steps 150 and 155 and 160 are replaced by the steps shown in FIG. 2. Upon receiving a request to alter, e.g. delete, a particular user account, the method compares the calculated user importance score with a defined threshold in step 210 and decides in step 215 if the threshold is exceeded, i.e. if the user has a perceived importance that is too high to simply allow the request to alter the user account. It should be understood that steps 210 and 215 alternatively may be performed when the user importance score is calculated, in which case the user account may contain a flag indicative of the user importance exceeding this threshold. In this case, step 210 and 215 in FIG. 2 may be replaced by a step in which the method checks if the user account that is the subject of the request identified in step 145 contains such a flag.

If the user importance score does not exceed the defined threshold, the method may proceed to step 160 in which the requested alteration of the user account is executed or may instead proceed to step 150 in which the system administrator requesting the alteration is prompted with the user information score and the request to confirm the requested alteration, as explained in more detail in the detailed description of FIG. 1. On the other hand, if the user importance score does exceed the defined threshold, the method may proceed to step 220 in which the system administrator is prompted to provide additional authorization for the requested alteration of the user account, e.g. additional security information. This additional authorization may have to be provided by a different person to provide an extra level of robustness to the present method of protecting the (data) integrity of the computer system.

The method subsequently checks in step 225 if the additional authorization has been received, in which case the method may proceed to step 160 in which the requested alteration of the user account is executed or may instead proceed to step 150 in which the system administrator requesting the alteration is prompted with the user information score and the request to confirm the requested alteration, as explained in more detail in the detailed description of FIG. 1. However, in the absence of the required additional authorization, the method may instead refuse the requested alteration of the user account and proceed to step 165 instead. This refusal may be communicated to the system administrator in any suitable manner, e.g. by sending an on-screen, e-mail or other suitable message.

Figure 3:
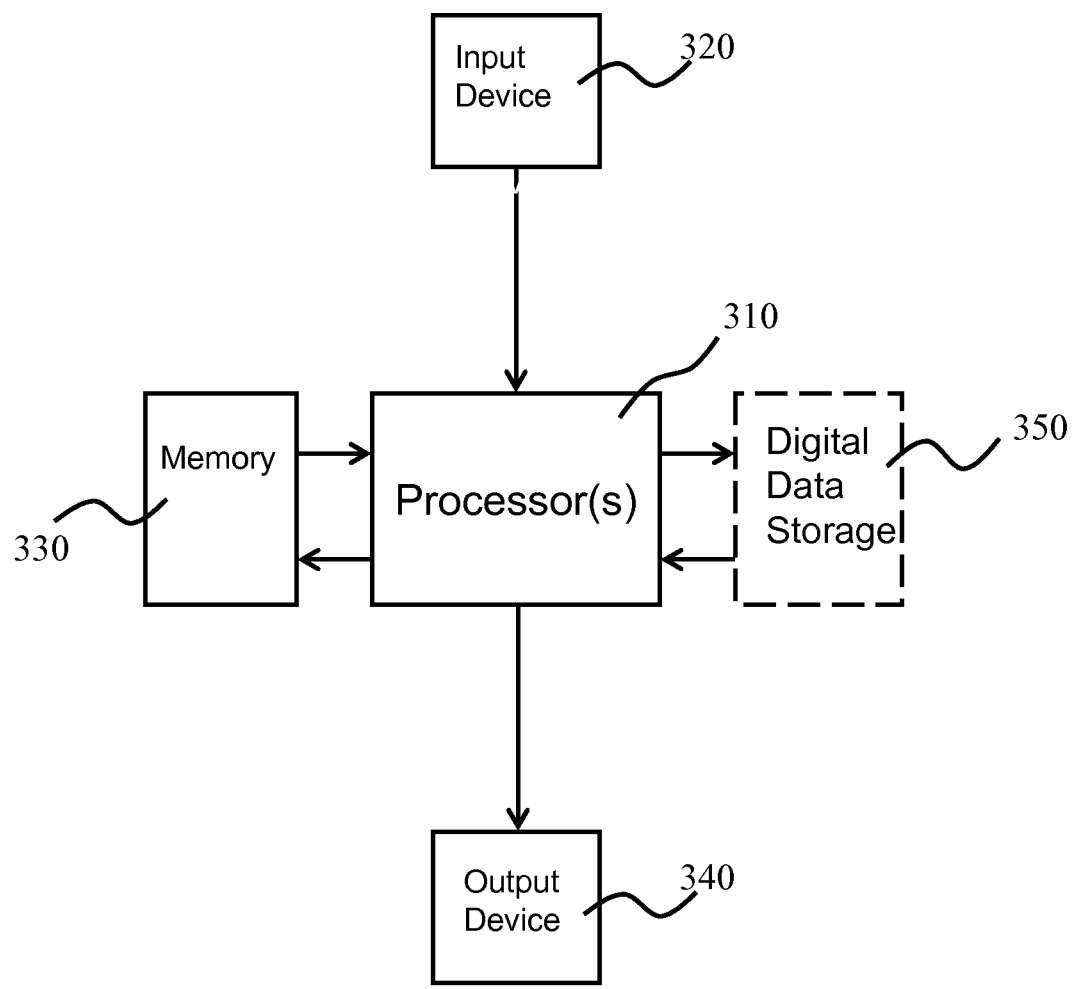
FIG. 3 schematically depicts a computer system according to an embodiment of the present invention.

A non-limiting example of a suitable system 300 for executing such a method is shown in FIG. 3. A computer system 300 includes one or more processors 310 adapted to execute the computer program code stored on the aforementioned computer program product. It should be understood that in the case of the computer system 300 including multiple processors 310, at least some of these processors may be integrated into a single physical device, e.g. multiple cores on a single chip. An input device 320, a memory 330, which may be a distributed memory and an output device 340 are all communicatively coupled to the one or more processors 310.

The input device 320 may for instance be a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, and so on.

The output device 340 may for instance be a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), and so on.

The memory 330 may for instance be a cache, a dynamic random access memory (DRAM), a read-only memory (ROM), a hard disk, a floppy disk, a magnetic tape, an optical storage medium such as a compact disc (CD) or a digital versatile disc (DVD), and so on. The memory 330 typically stores the computer program code defining the method steps of one or more of the embodiments of present invention for execution by the one or more processors 310.

In an embodiment, the system 300 may be communicatively coupled to digital data storage 350, which may store the various user accounts to be monitored by the execution of the aforementioned program code on the one or more processors 310. In an embodiment, the digital data storage 350 is separate from the system 300, in which case the system 300 may be adapted to access the digital data storage 350 over a network, e.g. a LAN or the Internet. In an alternative embodiment, the digital data storage 350 forms a part of the system 300. In yet another embodiment, the digital data storage 350 forms a part of the memory 330.

In operation, the at least one processor 310 may download the computer-readable program code from the memory 330 and execute the program code to implement the method as described in detail with the aid of FIG. 1 or FIG. 2. For instance, the at least one processor 310 may receive the monitoring rules, e.g. the events to be monitored, from a system administrator via the input device 320 and may continuously monitor the events on the computer system 300, e.g. monitoring utilization of the one or more processors 310 by the monitored user(s), monitoring access of the files owned by the monitored user(s) on the digital data storage 350, monitoring the number of executable scripts owned by the monitored user(s) on the digital data storage 350, and so on. At defined points in time, e.g. at defined intervals or when an alteration such a (partial) deletion of a user account is requested, the at least one processor 310 may calculate the user importance score using a defined algorithm that includes the monitored events as variables, as previously explained.

In case of a requested alteration, e.g. partial or complete deletion, of a user account by an user authorized to make such alterations, e.g. a system administrator, the at least one processor 310 may send the calculated user importance score to an appropriate output device 340 together with a request for confirmation of the alteration request or additional authorization for this request as previously explained. This may be preceded by the at least one processor 310 determining if such additional verification is required by comparing the calculated user importance score with a defined threshold. Upon receiving the requested additional information from e.g. the input device 320, the at least one processor 310 may perform the requested alteration of the user account stored in the memory 330 and/or the digital data storage 350.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method for improving an integrity of a computer system comprising a plurality of user accounts, the method comprising:
    monitoring, by one or more processors, a plurality of events corresponding to a first user account of the plurality of user accounts on the computer system, wherein the first user account corresponds to a first user and the monitored events are performed by one or more second users associated with the first user, and wherein the monitoring further comprises monitoring a utilization of at least one of the one or more processors by the first user of the first user account;
    assigning, by at least one of the one or more processors, an importance score to the first user account that is indicative of importance of the first user account to the integrity of the computer system, the importance score being calculated from the monitored events;
    providing, by at least one of the one or more processors, the importance score to a system administrator in response to detecting the administrator attempting to delete the first user account; and
    enabling the system administrator to delete the first user account in response to receiving a confirmation that the system administrator has received the importance score.

2. The method of claim 1, wherein the monitoring further comprises monitoring access of one or more files within the first user account by one or more other users.

3. The method of claim 1, wherein the monitoring further comprises monitoring a number of executable scripts within the first user account.

4. The method of claim 1, further comprising calculating the importance score by applying one or more respective weighting factors to one or more different types of the monitored events and combining the weighted events of the one or more different types into the importance score.

5. The method of claim 4, further comprising receiving the one or more respective weighting factors from the system administrator prior to the calculating.

6. The method of claim 1, wherein providing the importance score to the system administrator further comprises returning a request for the confirmation to the system administrator.

7. The method of claim 1, further comprising providing the system administrator with a request for authorization information when the assigned importance score exceeds a defined threshold.

8. A computer program product stored in a non-transitory computer readable storage medium, comprising computer instructions therein that, when executed by an information handling system, causes the information handling system to perform actions comprising:
    monitoring a plurality of events corresponding to a first user account of the plurality of user accounts on the information handling system, wherein the first user account corresponds to a first user and the monitored events are performed by one or more second users associated with the first user, and wherein the information handling system comprises at least one processor, and the monitoring further comprises monitoring a utilization of the at least one processor by the first user of the first user account;

assigning an importance score to the first user account that is indicative of importance of the first user account to an integrity of the information handling system, the importance score being calculated from the monitored events;

providing the importance score to a system administrator in response to detecting the administrator attempting to delete the first user account; and enabling the system administrator to delete the first user account in response to receiving a confirmation that the system administrator has received the importance score.

9. The computer program product of claim 8, wherein the monitoring further comprises monitoring access of one or more files within the first user account by one or more other users.

10. The computer program product of claim 8, wherein the monitoring further comprises monitoring a number of executable scripts within the first user account.

11. The computer program product of claim 8, wherein the actions further comprise calculating the importance score by applying one or more respective weighting factors to one or more different types of the monitored events and combining the weighted events of the one or more different types into the importance score.

12. The computer program product of claim 8, wherein the actions further comprise providing the system administrator with a request for authorization information when the assigned importance score exceeds a defined threshold.

13. An information handling system comprising:
one or more processors;
a memory coupled to at least one processor of the one or more processors; and
a set of instructions stored in the memory and executed by the at least one processors, wherein the set of instructions perform actions of:

monitoring a plurality of events corresponding to a first user account of the plurality of user accounts on the information handling system, wherein the first user account corresponds to a first user and the monitored events are performed by one or more second users associated with the first user, and wherein the monitoring further comprises monitoring a utilization of the at least one processor by the first user of the first user account;

assigning an importance score to the first user account that is indicative of importance of the first user account to an integrity of the information handling system, the importance score being calculated from the monitored events;

providing the importance score to a system administrator in response to detecting the administrator attempting to delete the first user account; and enabling the system administrator to delete the first user account in response to receiving a confirmation that the system administrator has received the importance score.

14. The information handling system of claim 13, wherein the monitoring further comprises monitoring access of one or more files within the first user account by one or more other users.

15. The information handling system of claim 13, wherein the monitoring further comprises monitoring a number of executable scripts within the first user account.

16. The information handling system of claim 13, wherein the actions further comprise calculating the importance score by applying one or more respective weighting factors to one or more different types of the monitored events and combining the weighted events of the one or more different types into the importance score.

17. The information handling system of claim 13, wherein the actions further comprise providing the system administrator with a request for authorization information when the assigned importance score exceeds a defined threshold.

* * * * *